Nov. 25, 1969   J. A. MEHR   3,480,304

SWIVEL JOINT FOR A LAMP

Filed May 31, 1968

Inventor
JACOB A. MEHR, DECEASED,
BY EDNA A. MEHR, ADMINISTRATRIX

By Cohn and Powell
attorneys

United States Patent Office 3,480,304
Patented Nov. 25, 1969

3,480,304
SWIVEL JOINT FOR A LAMP
Jacob A. Mehr, deceased, late of Kirkwood, Mo., by Edna A. Mehr, administratrix, Kirkwood, Mo., assignor to Dazor Manufacturing Corp., a corporation of Delaware
Filed May 31, 1968, Ser. No. 744,240
Int. Cl. F16l *27/00;* F16c *11/00*
U.S. Cl. 287—14                                         11 Claims

ABSTRACT OF THE DISCLOSURE

A swivel joint for supporting a lamp reflector or any other device in adjusted position about two axes. The joint includes a fitting connected to the device which has a stem received in a socket provided between separable body sections, the stem defining a first axis. A clamping means engages opposite sides of a pair of brackets to clamp the body sections to the stem. The clamping means includes a pin, defining a second axis, extending transversely through the bracket and body sections and extending past a reduced stem portion and between axially spaced stem shoulder portions of greater diameter to preclude unintentional longitudinal axial movement of, and to position, the stem in the body. An abutment means on the stem outwardly of the socket selectively engages a stop means carried by the body outwardly of the socket to determine the limits of the range of rotational adjustment of the stem about the first axis. In one embodiment, a washer of low friction material is carried by each body section and is located about the second axis, the washer projecting into the socket and engaging the stem to enable easy stem rotation yet to hold the stem in adjusted position when clamped.

BACKGROUND OF THE INVENTION

This invention relates generally to improvements in a swivel joint, and more particularly to an improved swivel joint especially adapted for supporting a lamp in angularly adjusted position about two transverse axes.

The heretofore conventional swivel joints were of relatively complicated structure having a multiplicity of parts, which resulted in an expensive mechanism. Despite the complexity of the mechanism, the rotatively mounted stem to which the lamp reflector was attached, was relatively difficult to rotate in some instances to angularly adjusted positions, or conversely, if easy to rotate, it was difficult to clamp securely after adjustment.

Moreover, in some prior joint constructions, the rotatively mounted stem could move longitudinally and axially in its mounting, and consequently would be disturbed in its exact relationship with the coacting transverse second axis.

The stop means for limiting the angular adjustment of the joint stem, and hence of the associated reflector, was in many prior swivel joints located within the housing of the joint where it was not visible or readily accessible. Such stop means were relatively complex in structure and required accurate placement and alignment upon initial assembly.

SUMMARY OF THE INVENTION

The present swivel joint is of a simple, uncomplicated structure consisting of only a few parts, and hence is extremely economical to manufacture. The joint is easy to rotate to angularly adjusted positions and is easy to clamp securely in any adjusted position. The rotatively mounted stem cannot be unintentionally moved axially and longitudinally in its mounting, and consequently, its structural relationship with the transverse swivel axis is maintained.

The swivel joint includes a stem received in a socket formed between body sections, the stem defining a first axis about which the supported device is rotatively adjustable. A pair of brackets engage opposite sides of the body sections, and a clamping means engages opposite sides of the brackets and selectively clamps the body sections to the stem. The clamping means includes a pin extending transversely through the brackets and body section and extending between axially spaced shoulder portions on the stem to preclude unintentional axial longitudinal movement of the stem in the body, the pin defining the second axis about which the supporting device is rotatively adjustable.

A stop means is carried by the body outwardly and adjacent one open end of the socket, and an abutment means is carried by and rotatable with the stem outwardly and adjacent one open end of the socket, the abutment means engaging the stop means to determine the limits of the range of rotational adjustment of the stem about the first axis. The position of the clamping pin between the axially spaced shoulder portions of the stem automatically align and position the cooperating stop means and abutment means. The coacting means and abutment means are located outwardly of the body and are therefore visible and readily accessible.

A washer of a low friction material such as Teflon, is carried by each body section and is located about the second axis, the Teflon washer enables easy stem rotation and yet holds the stem in adjusted position when clamped. The washer projects into the socket and engages the stem. The brackets engage and urge the washers inwardly of the socket and frictionally against opposite sides of the stem.

DESCRIPTION OF THE PREFERRED EMBODIMENTS

Figure 1:
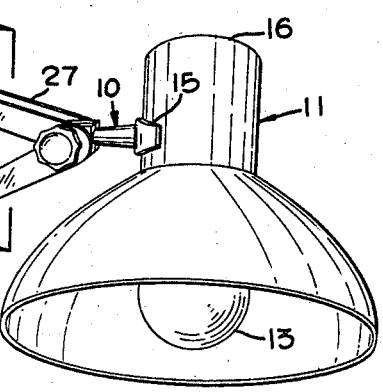
FIG. 1 is a fragmentary, perspective view of the swivel joint utilized in a lamp.

Referring now by characters of reference to the drawing, and first to FIG. 1, it will be understood that the swivel joint generally indicated by 10 serves to interconnect a lamp reflector 11 to a pair of arms 12 of a lamp assembly. As is usual, the lamp reflector 11 receives a bulb 13. The swivel joint 10 enables the angular adjustment of the reflector 11 independently and concurrently about two angularly related axes.

Figure 3:
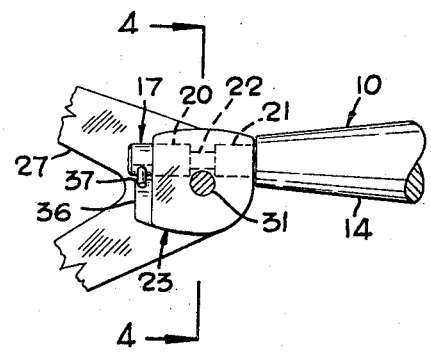
FIG. 3 is a view partly in cross section, taken on line 3—3 of FIG. 2.

The swivel joint 10 includes a tapered stem body 14 having a greater diameter at its outer end and a lesser diameter at its inner end as is best shown in FIG. 3. From FIG. 1, it is seen that a substantially U-shaped yoke 15 is attached to the larger diameter end of stem body 14, the yoke 15 being secured to the cylindrical portion 16 of the reflector 11. Referring again to FIG. 3, a substantially cylindrical stem 17 is formed integral with and extends from the lesser diameter end of stem body 14. As will be apparent from the later detailed description of parts, the stem 17 defines the first axis about which the supported reflector 11 can be rotated. The stem 17 includes a pair of axially spaced shoulder portions 20 and 21 having a reduced stem portion 22 therebetween.

Figure 4:
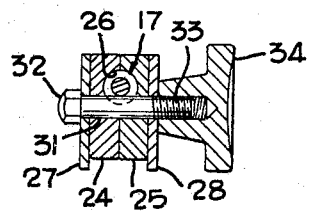
FIG. 4 is a cross sectional view taken on line 4—4 of FIG. 3.

A body referred to by 23 receives and mounts the stem 17. The body 23 consists of a pair of mating and compatible body sections 24 and 25 as best seen in FIG. 4. Formed between the body sections 24 and 25 is an elongate, substantially cylindrical socket 26 that is open at both ends. The diameter of socket 26 is substantially the diameter of the stem 17. The stem 17 is located in the socket 26 and is retained by the coacting body sections 24 and 25.

Disposed on and engaging opposite sides of the body 23 are a pair of V-shaped brackets 27 and 28. The apex portion of bracket 27 engages the outer side of body section 24, and the apex portion of the bracket 28 engages the outer side of the body section 25. The outer ends of the brackets 27 and 28 are attached by pivot pins 30 to lamp arms 12.

The clamping means for selectively retaining the stem 17 in a rotatively adjusted position includes a pin 31 having a head 32 at one end and a threaded opposite shank end 33. The pin 31 extends transversely through the brackets 27 and 28, and through the body sections 24 and 25. The pin 31 extends past the reduced stem portion 22 and between the shoulder portions 20 and 21. The pin head 32 engages the bracket 27. An adjusting knob 34 is threadedly attached to the threaded pin end 33 and engages the other bracket 28.

The pin 31 constitutes a second axis about which the supported reflector 11 can be rotated, this second axis being located at right angles to the first axis defined by stem 17.

Upon loosening the knob 34, the stem 17 can be rotated in its socket 26 between the body sections 24 and 25, and simultaneously or independently, the body 23 can be rotated about the pin 31. When the stem body 14 is located in the desired adjusted position, the knob 34 is tightened so that the brackets 27–28 and body sections 24–25 are clamped between the pin head 32 and knob 34. When tightened, the stem 17 is clamped between the body sections 24–25 in its socket 26 and the body 23 is clamped securely between the V-shaped brackets 27–28.

The body sections 24 and 25 are provided with rearwardly extending stop shoulders 35 and 36, respectively. These stop shoulders 35 and 36 are located outwardly of the socket 26 and adjacent the open socket end through which the stem 17 projects. These stop shoulders 35 and 36, constituting a stop means, are tapered toward the open socket end and are located in side-by-side relation upon assembly of the body sections 24 and 25.

A coacting abutment means is formed on the stem 17, the abutment means consisting of a projection 37 attached to and carried by the stem 17 outwardly of the socket 26 yet immediately adjacent the stop means. The projection 37 engages the stop shoulders 35 and 36 upon rotation of the stem 17 in opposite directions, and thereby determines the limits of the range of rotational adjustment of the stem 17 about the first axis.

The transverse pin 31 extending between the stem shoulders 20 and 21 and extending past the reduced stem portion 22 precludes any unintentional longitudinal axial movement of the stem 17 in the body socket 26. Moreover, this structural arrangement accurately aligns and positions the stop projection 37 with the stop shoulders 35 and 36, whereby to cause effective engagement upon rotation of the stem 17.

It is thought that the functional advantages of the swivel joint have become apparent in view of the foregoing detailed description of parts, but for completeness of disclosure, the operation of the joint will be briefly described.

In order to swivel the lamp reflector 11 about the first axis defined by stem 17, the knob 34 is slightly loosened to release a clamping pressure between the stem 17 and the body sections 24 and 25. Then, the reflector 11 can be rotated by turning the stem 17 in the body socket 26. The engagement of the stem projection 37 with either of the stop shoulders 35 or 36 will determine the limit of such rotational movement.

In addition, because the clamping pressure between the body 23 and cooperating brackets 27 and 28 is relieved upon loosening the knob 34, the lamp reflector 11 can be rotated about the second axis defined by clamping pin 31 by swinging the stem 17 and body 23 about such pin 31.

When the position of the lamp reflector 11 is adjusted as desired about either or both of the axes, the knob 34 is tightened so as to clamp the body 23 securely between the brackets 27 and 28 and to clamp the stem 17 securely between the body sections 24 and 25. When so clamped, the component parts of the swivel joint are securely locked in position relative to both axes.

Figure 6:
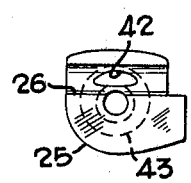
FIG. 6 is an opposite side view of the body section shown in FIG. 5.
Figure 5:
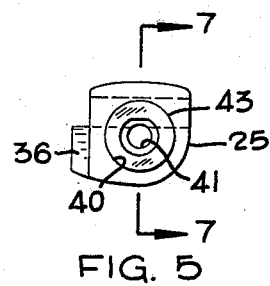
FIG. 5 is a side elevational view of a modified body section.
Figure 7:
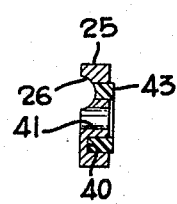
FIG. 7 is a cross sectional view taken on line 7—7 of FIG. 5.

A modified construction of the body 23 is illustrated in FIGS. 5 through 8. FIGS. 5 through 7 illustrate the body section 25 modified by the provision of an annular recess 40 formed concentrically about the hole 41 through which the clamping pin 31 extends when assembled. The recess 40 is open at the outer side of the body section 25 and communicates with the socket 26 through an elongate opening 42. Disposed in the annular recess 40 is an annular washer 43 made of a low friction material such as Teflon as is best seen in FIG. 7. The washer 43 extends through the opening 42 into the socket 26 for frictional engagement with the stem 17. The washer 43 is of a sufficient thickness so that its outer surface projects slightly beyond the outer side of body section 25 so as to engage the adjacent and contiguous bracket 28.

The body section 24 can carry a similar washer 43 also, and would engage the bracket 27.

Figure 8:
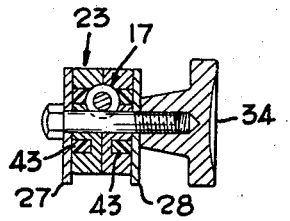
FIG. 8 is a cross sectional view similar to FIG. 4 but showing the use of the modified body sections of FIGS. 5–7.
Figure 2:
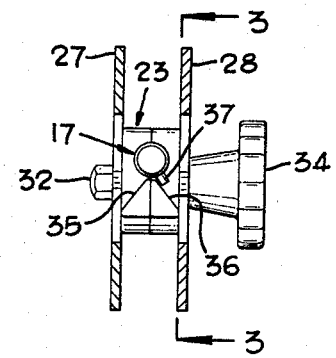
FIG. 2 is an enlarged cross sectional view taken on line 2—2 of FIG. 1.

The assembly of the swivel joint utilizing body sections 24 and 25 incorporating annular washers 43 is shown in FIG. 8. The operation and functional advantages of this embodiment of FIG. 8 is the same as that previously described with respect to the embodiments of FIGS. 1 through 4. In addition, the provision of the washers 43 enables an easy turning of the stem 17 in the socket 26 when the clamping pressure is relieved, yet it enables the stem 17 to be securely clamped in adjusted position.

If it is desired to turn the stem 17 about the first axis or to rotate the body 23 about the second axis, the clamping pressure is relieved by loosening the knob 34. As a result, the clamping pressure between the stem 17 and the body sections 24 and 25 and/or the washers 43 projecting through the openings 42, is removed. The engagement of the stem shoulders 20 and 21 with the washers 43 enables easy turing of the stem 17 to an adjusted position. Moreover, because the washers 43 extend slightly beyond the outer side of the body sections 24 and 25 for engagement with the adjacent brackets 27 and 28 respectively, the body 23 will swing easily about the second axis defined by pin 31, the washers 43 enabling and facilitating easy relative movement of the body 23 and brackets 27 and 28.

When disposed in the adjusted position, the knob 34 is tightened as previously described to clamp the component parts together. When clamped, the brackets 27 and 28 urge the washers 43 through the body section openings 42 into clamping engagement with the stem 17. Although the washers 43 are of a low friction material which enables ease of movement of the engaged parts upon release of clamping pressure, such low friction material such as Teflon will enable a secure friction grip when the clamping pressure is applied.

What is claimed is:

1. A swivel joint for supporting a device in adjusted position about two axes, comprising:

(a) a fitting adapted to be connected to the device, the fitting including a stem defining a first axis about which the device is rotatively adjustable,
(1) the stem having axially spaced shoulder portions of greater diameter than an intervening stem portion,
(b) a body including separable body sections, the body sections having a socket therebetween in which the stem is received,
(c) a pair of brackets engaging opposite sides of the body sections,
(d) clamping means engaging opposite sides of the brackets and selectively clamping the body sections to the stem, and
(e) the clamping means including a pin defining a second axis about which the device is rotatively adjustable, the pin extending transversely through the brackets and body sections and extending past the intervening stem portion between the shoulder portions to preclude unintentional longitudinal axial movement of and to retain the stem in the body.

2. A swivel joint as defined in claim 1, in which:
(f) the body sections provide compatible bearing walls forming the socket and urged against the stem selectively by the clamping means.

3. A swivel joint as defined in claim 1, in which:
(f) the body socket is open at both ends,
(g) stop means is carried by the body outwardly of the socket and adjacent one open end,
(h) the stem extends through the socket and outwardly of the said one open end, and
(i) means on the stem outwardly of the socket engages the stop means to determine the range of rotational adjustment of the stem about the first axis.

4. A swivel joint as defined in claim 1, in which:
(f) the body socket is open at both ends,
(g) the body includes a stop shoulder outwardly of the socket and adjacent one open end,
(h) the stem extends through the socket and outwardly of the said one open end, and
(i) a projection is on and rotatable with the stem, the projection being located outwardly of the socket and engaging the stop shoulders to determine the range of rotational adjustment of the stem about the first axis.

5. A swivel joint as defined in claim, in which:
(f) a washer of low friction material is carried by each body section and is located about the second axis, the washer projecting into the socket and engaging the stem to enable easy stem rotation yet to hold the stem in adjusted position when clamped, and
(g) the brackets engage and urge the washers inwardly of the socket and frictionally against the stem.

6. A swivel joint as defined in claim 1, in which:
(f) the body socket is open at both ends,
(g) each body section includes a stop shoulder outwardly of the socket and adjacent one open end, the stop shoulders being disposed in adjacent side-by-side relation,
(h) the stem extends through the socket and outwardly of the said one open end, and
(i) a projection is on and rotatable with the stem, the projection being located outwardly of the socket and engaging the stop shoulders to determine the range of rotational adjustment of the stem about the first axis.

7. A travel joint as defined in claim 6, in which:
(j) the stop shoulders are tapered toward the open socket end.

8. A swivel joint as defined in claim 7, in which:
(k) each body section is provided with an outwardly open, annular recess at least partially communicating with the socket, and located about the second axis,
(l) an annular washer of low friction material is carried by each body section in the compatible, annular recess, the washer projecting into the socket and engaging the stem to enable easy stem rotation yet to hold the stem in adjusted position when clamped, and
(m) the brackets engage and urge the washers inwardly of the socket and frictionally against the stem.

9. A swivel joint for supporting a device in adjusted position about two axes, comprising:
(a) a fitting adapted to be connected to the device, the fitting including a stem defining a first axis about which the device is rotatively adjustable,
(b) the body including separable body sections, the body sections having a socket therebetween, the socket being open at both ends of the body,
(c) a pair of brackets engaging opposite sides of the body sections,
(d) clamping means engaging opposite sides of the bracket and selectively clamping the body sections to the stem,
(1) the clamping means including a pin defining a second axis about which the device is rotatively adjustable, the pin extending transversely through the brackets and body sections,
(e) stop means carried by the body outwardly of the socket and adjacent one open end, and
(f) abutment means on the stem outwardly of the socket selectively engaging the stop means to determine the limits of the range of rotational adjustment of the stem about the first axis.

10. A swivel joint as defined in claim 9, in which:
(g) the stop means is provided by adjacent side-by-side stop shoulders on the body sections, the stop shoulders being tapered toward the open socket end, and
(h) the abutment means is a projection on and rotatable with the stem, the projection engaging the tapered stop shoulders to determine the range limits.

11. A swivel joint as defined in claim 10, in which:
(i) each body section is provided with an outwardly open, annular recess at least partially communicating with the socket, and located about the second axis,
(j) an annular washer of low friction material is carried by each body section in the compatible annular recess, the washer projecting into the socket and engaging the stem shoulder portions to enable easy stem rotation yet to hold the stem in adjusted position when clamped, and
(k) the brackets engage and urge the washers inwardly of the socket and frictionally against the stem.

References Cited
UNITED STATES PATENTS

| | | | |
|---|---|---|---|
| 1,635,164 | 7/1927 | Amdur | 287—14 |
| 2,787,434 | 4/1957 | Jacobsen | 287—14 XR |
| 3,357,726 | 12/1967 | Gabrielson | 287—14 |
| 3,391,890 | 7/1968 | Perbal | 248—280 |

DAVID J. WILLIAMOWSKY, Primary Examiner

ANDREW V. KUNDRAT, Assistant Examiner

U.S. Cl. X.R.

248—281